United States Patent
Bronstein et al.

(10) Patent No.: US 11,323,153 B2
(45) Date of Patent: May 3, 2022

(54) PROTOCOL FOR MULTI-MASTER COMMUNICATION COORDINATION ON SHARED MEDIA CHANNEL

(71) Applicant: Enphase Energy, Inc., Petaluma, CA (US)

(72) Inventors: Vladimir Isaac Bronstein, Cupertino, CA (US); Gaurao Onkar Chaudhari, San Jose, CA (US); Kennan Herbert Laudel, San Jose, CA (US)

(73) Assignee: Enphase Energy, Inc., Petaluma, CA (US)

( * ) Notice: Subject to any disclaimer, the term of this patent is extended or adjusted under 35 U.S.C. 154(b) by 148 days.

(21) Appl. No.: 16/942,682

(22) Filed: Jul. 29, 2020

(65) Prior Publication Data

US 2021/0036738 A1 Feb. 4, 2021

Related U.S. Application Data

(60) Provisional application No. 62/879,620, filed on Jul. 29, 2019.

(51) Int. Cl.
*H04B 3/54* (2006.01)
*H02J 1/10* (2006.01)

(52) U.S. Cl.
CPC .............. *H04B 3/544* (2013.01); *H02J 1/106* (2020.01)

(58) Field of Classification Search
CPC .......... H04L 2012/6451; H04L 12/433; H04B 3/544; H04B 3/54
See application file for complete search history.

(56) References Cited

U.S. PATENT DOCUMENTS

| 4,380,063 A | 4/1983 | Janson et al. |
| 4,747,100 A | 5/1988 | Roach et al. |
| 7,406,094 B2 | 7/2008 | Propp et al. |
| 7,643,509 B2 | 1/2010 | Han et al. |

(Continued)

FOREIGN PATENT DOCUMENTS

| CN | 1649319 A | 8/2005 |
| CN | 100556044 C | 10/2009 |
| CN | 101998659 B | 4/2013 |

OTHER PUBLICATIONS

International Search Report for Application No. PCT/US2020/044115, dated Nov. 3, 2020.

*Primary Examiner* — Kevin Kim
(74) *Attorney, Agent, or Firm* — Moser Taboada

(57) ABSTRACT

A method and computer readable medium for communication on a shared media. In one embodiment, the method comprises holding a token by a first coordinator on a virtual ring, only a token-holding coordinator is permitted to transmit data associated with a first service level; transmitting data associated with the first service level, by the first coordinator, to device(s) on a first local domain; passing, by the first coordinator, the token to a second coordinator; periodically transmitting data associated with the first service level, by the second coordinator, to device(s) on a second local domain; receiving, by a third coordinator while the second coordinator holds the token, a message to transmit data associated with a second service level to device(s) of a third local domain; and transmitting, by the third coordinator while the second coordinator is not transmitting, the data associated with the second service level.

20 Claims, 5 Drawing Sheets

(56) References Cited

U.S. PATENT DOCUMENTS

| | | |
|---|---|---|
| 8,141,115 B2 | 3/2012 | Wohlert et al. |
| 8,239,068 B1 * | 8/2012 | Rossi ................ F24F 11/30 700/277 |
| 8,274,920 B2 | 9/2012 | Carter |
| 8,526,418 B2 | 9/2013 | Propp et al. |
| 9,634,723 B1 | 4/2017 | Lawal et al. |
| 9,774,467 B2 | 9/2017 | Fabre et al. |
| 2010/0074243 A1 | 3/2010 | Yonge, III et al. |
| 2010/0074304 A1 | 3/2010 | Flammer, III |
| 2012/0089260 A1 | 4/2012 | Krohne et al. |
| 2013/0297385 A1 | 11/2013 | Mehta et al. |

* cited by examiner

PROTOCOL FOR MULTI-MASTER COMMUNICATION COORDINATION ON SHARED MEDIA CHANNEL

CROSS-REFERENCE TO RELATED APPLICATION

This application claims benefit of U.S. provisional patent application Ser. No. 62/879,620, titled "Protocol for Multi-Master Communication Coordination on Shared Media Channel" and filed Jul. 29, 2019, which is herein incorporated in its entirety by reference.

BACKGROUND OF THE INVENTION

Field of the Invention

Embodiments of the present disclosure relate generally to power line communications and, in particular, to distributed generators using power line communications on shared power lines.

Description of the Related Art

Power distribution systems are prevalent throughout most countries for delivering power generated at a commercial power plant to consumers. Power distribution systems generally include high-voltage transmission lines for distributing generated power to one or more distribution centers, or substations, where the high-voltage is stepped down to a lower voltage and distributed further to consumers via feeder lines.

As the use of power generation from renewable energy sources continues to rise, more and more buildings that are connected to utility feeder lines also have a local renewable energy system (LRES) that is coupled to the utility feeder line. One example of an LRES is a solar power system comprising photovoltaic (PV) modules, one or more power converters (such as microinverters), and a coordinator (which also may be referred to as a system controller or a gateway). Within the communication domain of an LRES, the power converters and corresponding gateway may utilize power line communication (PLC) for communicating with one another.

For those LRESs sharing the same feeder line and using PLC, communication within the LRES may be subject to conflicts that result in data collision when multiple LRESs are communicating with their respective power converters at the same time. For example, multiple LRESs that share a feeder line may be installed independently from each other at different times by different installers and as such may not be aware of one another. As a result, their PLC communication over the feeder line may undesirably interfere with one another.

Therefore, there is a need in the art for a method and apparatus for enabling efficient communication for renewable local energy systems that exist on a single communication media segment while mitigating cross-domain interference.

SUMMARY OF THE INVENTION

Embodiments of the present invention generally relate to a decentralized communication protocol between local renewable energy system (LRES) scheduling coordinators on a shared media as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for a decentralized communication protocol between local renewable energy system (LRES) scheduling coordinators (e.g., residing on gateways, system controllers, and the like) that enables collision-free communication for each of the coordinators with their respective device nodes (also called communication domains or simply domains) on a shared media by dividing time for communication between domains in order to communicate over PLC in an efficient and reliable manner.

The communication technique described herein comprises using a round-robin token-passing protocol for sharing bandwidth for high-latency-tolerant messages, carrier-sense multiple access with collision avoidance (CSMA/CA) protocol for discovery of new joining domains and response timeouts for disappearing domains, and CSMA/CA protocol for transmission of rarely occurring urgent (low latency) messages. Multiple scheduling coordinators that exist on a single communication media segment and which are deployed independently (e.g., at separate residences) are enabled to efficiently communicate with their respective device nodes (e.g., power converters, such as microinverters) using the media channel bandwidth up to its full communication capacity while mitigating cross-domain interference. Additionally, carrier-sense multiple access with collision avoidance (CSMA/CA) is employed to randomly interrupt existing communication for communication of a high-priority (i.e., urgent) message. The communication technique described herein is fully distributed; i.e., all scheduling coordinators have equivalent communication rights and none are central to ensure robustness (if any of the coordinators stops functioning, the network reconfigures itself automatically).

Figure 1:
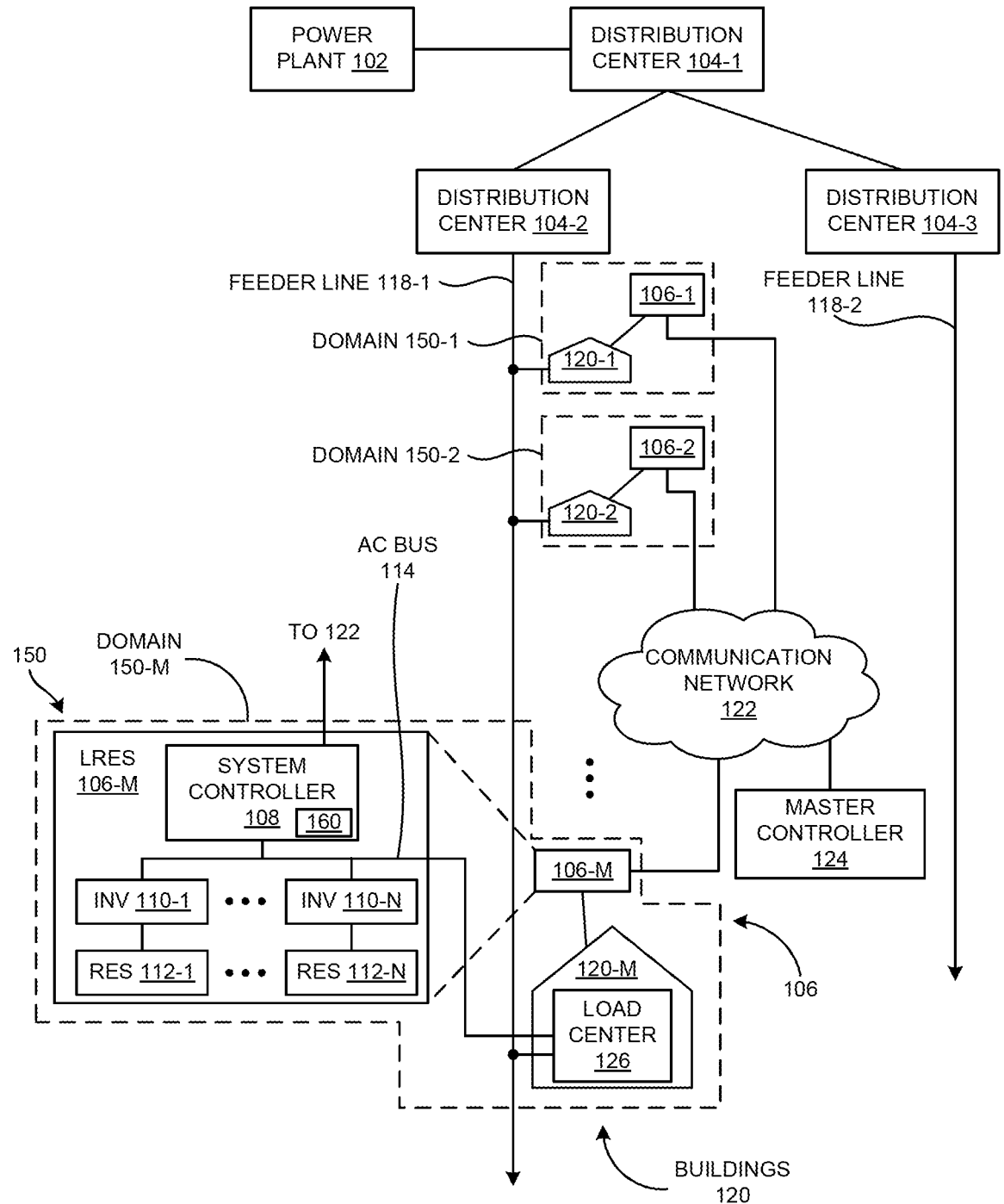
FIG. 1 is a block diagram of a system topology for power distribution in accordance with one or more embodiments of the present invention.

FIG. 1 is a block diagram of a system 100 for power distribution in accordance with one or more embodiments of the present invention. This diagram only portrays one variation of the myriad of possible system configurations. The present invention can function in a variety of environments and systems.

The system 100 comprises a power grid including a power plant 102 (such as a commercial power plant) coupled by high-voltage transmission lines to a first distribution center 104-1, which is further coupled to other distribution centers (i.e., substations) 104-2 and 104-3 for local distribution. Although three distribution centers are depicted in FIG. 1, the system 100 may comprise fewer or more distribution centers in other embodiments.

The distribution centers 104-2 and 104-3, which step-down the voltage levels received from the distribution center 104-1, are coupled to feeder lines 118-1 and 118-2, respectively. The feeder lines 118-1 and 118-2 are each coupled to a plurality of buildings, such as residential and/or commercial buildings, for providing power to the buildings. As depicted in FIG. 1, buildings 120-1 . . . 120-M, which may be referred to as "buildings 120", are coupled to the feeder line 118-1. Each of the buildings 120 is coupled to a corresponding local renewable energy system (LRES) 106 (which may simply be referred to as LRES 106) that generates AC power from energy received from a renewable energy source (RES) (i.e., a natural source or process that is constantly replenished, such as sunlight, wind, rain, tides, waves, geothermal heat, and the like); i.e., buildings 120-1, 120-2 . . . 120-M are respectively coupled to LRESs 106-1, 106-2 . . . 106-M. Each building 120 and the corresponding LRES 106 are part of a domain 150 that is coupled to the feeder line 118-1—i.e., the building 120-1 and the LRES 106-1 are part of the domain 150-1, the building 120-2 and the LRES 106-2 are part of the domain 150-2, etc. In some embodiments, the number "M" may be on the order of 16, although in other embodiments it may be more or less. Although not shown in FIG. 1, one or more analogous domains are coupled to the feeder line 118-2.

Although the number and/or types of components within individual LRESs 106 may vary, LRES 106-M is representative of the LRESs 106 and is shown in detail for further discussion. The LRES 106-M comprises a plurality of DC-AC microinverters (power conditioners) 110-1 . . . 110-N (which may be referred to as "microinverters 110") respectively coupled to RESs 112-1 . . . 112-N (which may be referred to as "RESs 112")—although in other embodiments multiple RESs 112 may be coupled to a single inverter 110 (e.g., a single, centralized inverter for the LRES 106)—and a system controller 108 communicatively coupled to the microinverters 110 via an AC bus 114. The RESs 112 may be any type of system for generating DC power from a renewable form of energy, such as wind, solar, hydro, and the like, although in some alternative embodiments one or more of the RESs 112 may be replaced by a non-renewable energy source, such as a diesel generator. In certain embodiments, each RES 112 is a photovoltaic (PV) module; in some such embodiments, one or more of the RESs 112 is an energy storage/delivery device, such as a battery, capable of storing energy and delivering stored energy as controlled by the corresponding microinverter 110. The microinverters 110 generate AC power from the corresponding RES 112 and couple the generated power to the AC bus 114. The LRES 106-M is shown as having a number "N" paired microinverters 110 and RESs 112; the number "N" may vary among the different LRESs 106.

The AC bus 114 is coupled to the corresponding feeder line 118-1 via a load center 126 which may be located in or proximate to the corresponding building 120-M. The microinverters 110 generate AC power that is utility power grid compliant and couple the generated AC power to the corresponding feeder line 118-1 via the AC bus 114/load center 126. In other embodiments, one or more of the microinverters 110 may be a different type of power conditioner, such as an AC-AC converter, that is coupled to a resource that provides a suitable input power to the power converter.

The system controller 108 is coupled to the AC bus 114 and communicates with the microinverters 110 via power line communications (PLC), which may be referred to as a local PLC network. The system controller 108, which may also be referred to as a gateway, comprises a scheduling coordinator module 160 (also called "coordinator 160"), e.g., a PLC MAC function for performing the coordinator functions described herein. The system controller 108 may send command and control signals to one or more of the microinverters 110 and/or receive data (e.g., status information, data related to power conversion, communications information, and the like) from one or more of the microinverters 110 via the AC bus 114. The system controller 108 may periodically poll the microinverters 110, for example on the order of every 5-15 minutes, to obtain data from the microinverters 110.

The system controller 108 additionally has a communication link to a master controller 124 via a communications network 122 (e.g., the Internet) for sending information to and/or receiving information from the master control 124, such as information related to the corresponding LRES 106, information related to the corresponding feeder line 118, and the like; in one or more embodiments, the master controller 124 may be a computing device that accesses an application (e.g., an energy management application) on a cloud-based computing platform for performing the master controller functions described herein. The system controller 108 may be linked to the communications network 122 (e.g., a wide area network (WAN)) using wireless and/or wired techniques, e.g., Ethernet, WiFi, cellular data (3G/4G), and the like. In some embodiments, the system controller 108 may be coupled to the communication network 122 via a commercially available router (home gateway).

The master controller 124 may utilize wired and/or wireless techniques for communication via the communications network 122. The master controller 124 may manage each of the LRESs 106, control the operation of the microinverters 110, and/or receive data regarding the health and/or performance of the microinverters 110 (such as power generated, voltage generated, current generated, alarm information, alert information, status information, and the like) as well as the feeder lines 118 (such as line voltage, line frequency, and the like) from the system controller 108. The master controller 124 may store some or all of the information it receives for subsequent data analysis and/or report generation; additionally or alternatively, the system controller 108 may store all or some of such data and communicate the stored data to the master controller 124 (e.g., upon request by the master controller 124 or periodically).

In addition to coupling generated AC power to the feeder line 118-1 and/or receiving AC power from the feeder line 118-1, the domains 150 all utilize the feeder line 118-1 for communication between the system controllers 108 and their corresponding microinverters 110, which may result in unwanted interference with each other. In accordance with one or more embodiments of the present invention, each of the system controllers 108 employs a communication protocol for collision-free power line communication on the shared feeder line 118-1. The communication protocol divides time between the domains 150 for communication and uses a round-robin token-passing protocol for sharing bandwidth, carrier-sense multiple access with collision avoidance (CSMA/CA) protocol for discovery of new joining domains 150 and response timeouts for disappearing domains 150, as well as CSMA/CA for urgent messages (i.e., high priority messages, such as certain control messages) as described in detail further below.

In order to achieve communication without collision, a virtual token (e.g., a message), which may be referred to herein as simply a token, is passed from the coordinator 160 on the feeder line 118-1 to another coordinator 160 on the feeder line 118-1; when a particular coordinator 160 receives this token, it can then communicate with its respective microinverters 110. The coordinator 160 holding the token may communicate with its microinverters 110 during for a time quota (e.g., on the order of 5 seconds); when the time quota expires, the token is passed to the next coordinator 160 on the feeder line 118-1. The token continues to be passed among the coordinators 160 that share the feeder line 118-1, with each coordinator 160 being able to communicate with its corresponding microinverters 110 during the time period that it holds the token. This technique is described in greater detail below with respect to FIGS. 3A, 3B, and 3C.

In addition to mitigating cross-domain interference during periodic non-urgent (i.e., latency tolerant) communication with the microinverters 110, the communication protocol described herein is used for urgent messages to be transmitted to the microinverters 110; i.e., messages that cannot wait for a coordinator 160 to receive the token for communication privileges. For example, a coordinator 160 may receive a message from the master controller 124 or from a utility requiring its microinverters 110 to alter power generation within a short period of time, e.g., on the order of 2 seconds. For this type of quality of service, carrier-sense multiple access with collision avoidance (CSMA/CA) is employed to randomly interrupt existing communication controlled by the token-passing. For an urgent message, whichever other coordinator 160 is transmitting at the time can be interrupted with a very high degree of probability and with prioritized random access time slot. Although the actual transmission cannot be interrupted, the token-holding coordinator's time quota can be. The interrupting coordinator 160—i.e., the coordinator receiving the urgent message—waits until the current transmission from the token-holding coordinator 160 is finished, then uses prioritized random access to interrupt. In one or more embodiments, the prioritized random access works in the following slotted manner: the token-based access coordinator 160 waits for a number of slots, for example 5 slots, after the previous transmission ended before starting its next transmission. After detecting the end of the token-based transmission, the interrupting coordinator 160 starts transmitting to its microinverters 110 after a random number of slots, up to the slot number used for the token-based transmission. For example, if the token-based access coordinator 160 waits for 5 slots before its next transmission, the interrupting coordinator 160, after detecting the end of the token-based transmission, begins its transmission after a random number of slots between 1 and 4. Thus, an urgent message receives priority since it starts earlier than the next token-based transmission. The randomness of the slot number for the urgent message transmission helps to elevate the chance of the transmission being successful if multiple coordinators 160 randomly want to transmit urgent message at the same time. This technique for urgent message communication is described in greater detail further below with respect to FIGS. 3A, 3B, and 3C.

The communication protocol employed by the distributed network of system controllers 108 that share the same feeder line 118-1 additionally includes a discovery protocol for discovering the connection of a new system controller 108 to the feeder line 118-1. This discovery protocol works as follows. When a system controller 108 is powered-up and connected to the feeder line 118-1, its coordinator 160 first "listens" to determine whether there is any transmission on the feeder line 118-1 in order to understand whether it needs to be discovered or it's the first controller on the line and it can begin communicating. If this coordinator 160 discovers that there is some communication occurring on the feeder line 118-1, it waits to be discovered and added to the existing virtual ring (i.e., the virtual ring of coordinators between which the token is passed). In some embodiments, whichever coordinator 160 holds the token periodically enters a discovery window, for example every 2 minutes, in which it sends a special invitation message (i.e., a discovery broadcast message) that invites any existing system controllers 108/coordinators 160 on the feeder line 118-1 that have not been included in the virtual ring to advertise themselves. CSMA/CA collision-based protocol with randomized slotted access is used to mitigate collisions that may occur when multiple new system controllers 108 are connected to the feeder line 118-1. Once the coordinator 160 holding the token broadcasts the invitation, those coordinators 160 on the feeder line 118-1 that have not yet been discovered transmit a response utilizing the CSMA/CA protocol with randomized slotted access; i.e., new coordinators respond with random slot response (using a slot number greater than the maximum random slot number used for urgent messaging) and are discovered one at a time. For example, if the urgent message transmission utilizes a random slot between 1-4, the discovery response may be between, for example, 8-128 so that it is higher than 4 and still can be interrupted by the urgent message. Each coordinator 160 on the feeder line 118-1 is listening to the discovery message exchange and understands from this exchange that a new coordinator 160 appeared on the network; each coordinator 160 can then update its internal virtual ring table (which may also be referred to as a network view table) to include any new coordinators 160. In addition, if for some reason some coordinator 160 missed this exchange of messages, all coordinators 160 continuously, within regular communication, compare their internal virtual ring table with how the token is passed from one coordinator 160 to another coordinator 160, so at some point the coordinator 160 will see that the token is passed to this new coordinator 160 and repopulate its table, or, in a worst case, the new coordinator 160 will be rediscovered if it does not receive the token when it expects to. This technique for coordinator discovery is described in greater detail further below with respect to FIGS. 3A, 3B, and 3C.

As part of the token-based communication, once the token holding time quota expires for a coordinator 160 holding the token, it passes the token to the next coordinator 160 that is part of the virtual ring. This next coordinator 160 in the virtual ring is determined as follows according to some embodiments. All of the coordinators 160 coupled to the feeder line 118-1 are listening to the network and to the discovery of newly-added system controllers 108, as well as all other messages, and are recording the IDs of each system controller 108 communicating, where the IDs for the system controllers 108 are globally unique IDs generally assigned at the factory; e.g., a unique 6 byte ID. While each coordinator 160 listens to the network, it detects any new system controller 108 that is discovered as well as transmission from the coordinators 160 of other system controllers 108 on the network since each communication from a coordinator 160 contains its system controller's unique ID. As new system controllers 108 are discovered on the network, each existing coordinator 160 on the network adds the new system controller's unique ID to its database, for example in a table of system controller IDs on the network (which may be referred to as a network view table or a virtual ring table). The table of system controller IDs, which may include a system controller's own ID, is in a defined order, such an alphabetical-type or a bit number sequence order, allowing each of the virtual ring coordinators 160 to know the same sequence of system controllers 108 that are on the virtual ring.

Figure 2:
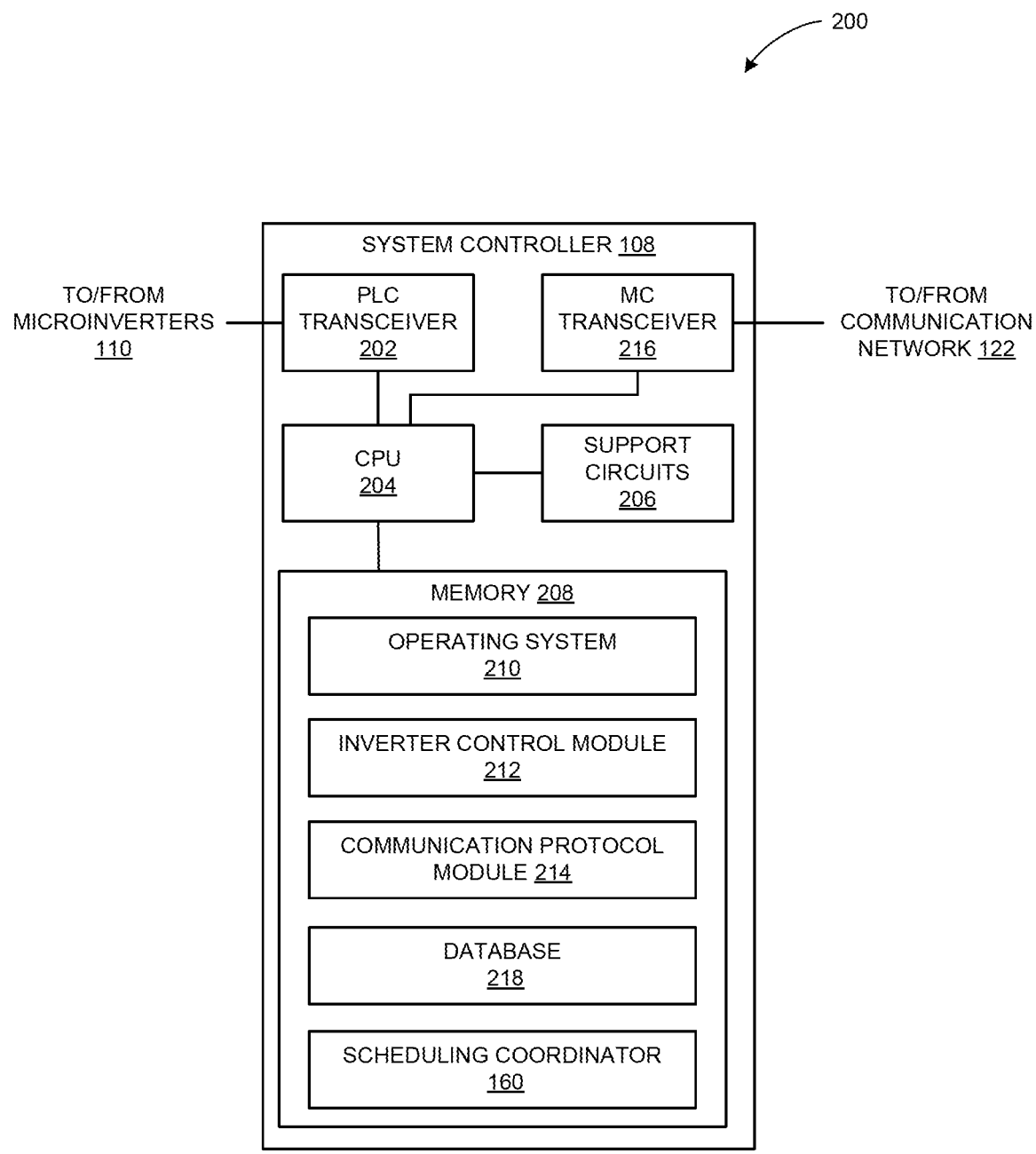
FIG. 2 is a block diagram of a controller in accordance with one or more embodiments of the present invention.

FIG. 2 is a block diagram of a system controller 108 in accordance with one or more embodiments of the present invention. The system controller 108 comprises a transceiver 216 for communication with the master controller 124 via the communications network 122, and a PLC transceiver 202 for communication with the microinverters 110 over the power line. The transceiver 202 comprises PLC modem hardware (e.g., implementing the OS model physical layer of communication) for communicating with the microinverters 110 using PLC via the AC bus 114. The transceiver 216 may utilize any suitable wireless and/or wired communication technique for communicating with the master controller 124.

The controller 108 further comprises at least one central processing unit (CPU) 204 coupled to each of the PLC transceiver 202, the transceiver 216, support circuits 206, and a memory 208. The CPU 204 may comprise one or more commercially available microprocessors; alternatively, the CPU 204 may include one or more application specific integrated circuits (ASICs). In some embodiments, the CPU 204 may be a microcontroller comprising internal memory for storing controller firmware that, when executed, provides the controller functionality herein. The controller 108 may be implemented using a general purpose computer that, when executing particular software, becomes a specific purpose computer for performing various embodiments of the present invention.

The support circuits 206 are well known circuits used to promote functionality of the CPU 204. Such circuits include, but are not limited to, a cache, power supplies, clock circuits, buses, network cards, input/output (I/O) circuits, and the like.

The memory 208 may comprise random access memory, read only memory, removable disk memory, flash memory, and various combinations of these types of memory. The memory 208 is sometimes referred to as main memory and may, in part, be used as cache memory or buffer memory. The memory 208 generally stores an operating system (OS) 210 of the controller 108. The OS 210 may be one of a number of available operating systems for microcontrollers and/or microprocessors. The memory 208 further stores non-transient processor-executable instructions and/or data that may be executed by and/or used by the CPU 204. These processor-executable instructions may comprise firmware, software, and the like, or some combination thereof.

The memory 208 may store various forms of application software, such as a microinverter control module 212 for providing operative control of the microinverters 110 (e.g., providing command instructions to the microinverters 110 regarding power production levels). The memory 208 further comprises the scheduling coordinator 160 for providing the coordination functions described herein, and a communication protocol module 214 comprising software that implements the MAC layer of the communication protocol described herein.

The memory 208 may also store a database 218 for storing data, such as data related to the operation of the microinverters 110, the corresponding domain 150, and/or other relevant data.

Figure 3A:
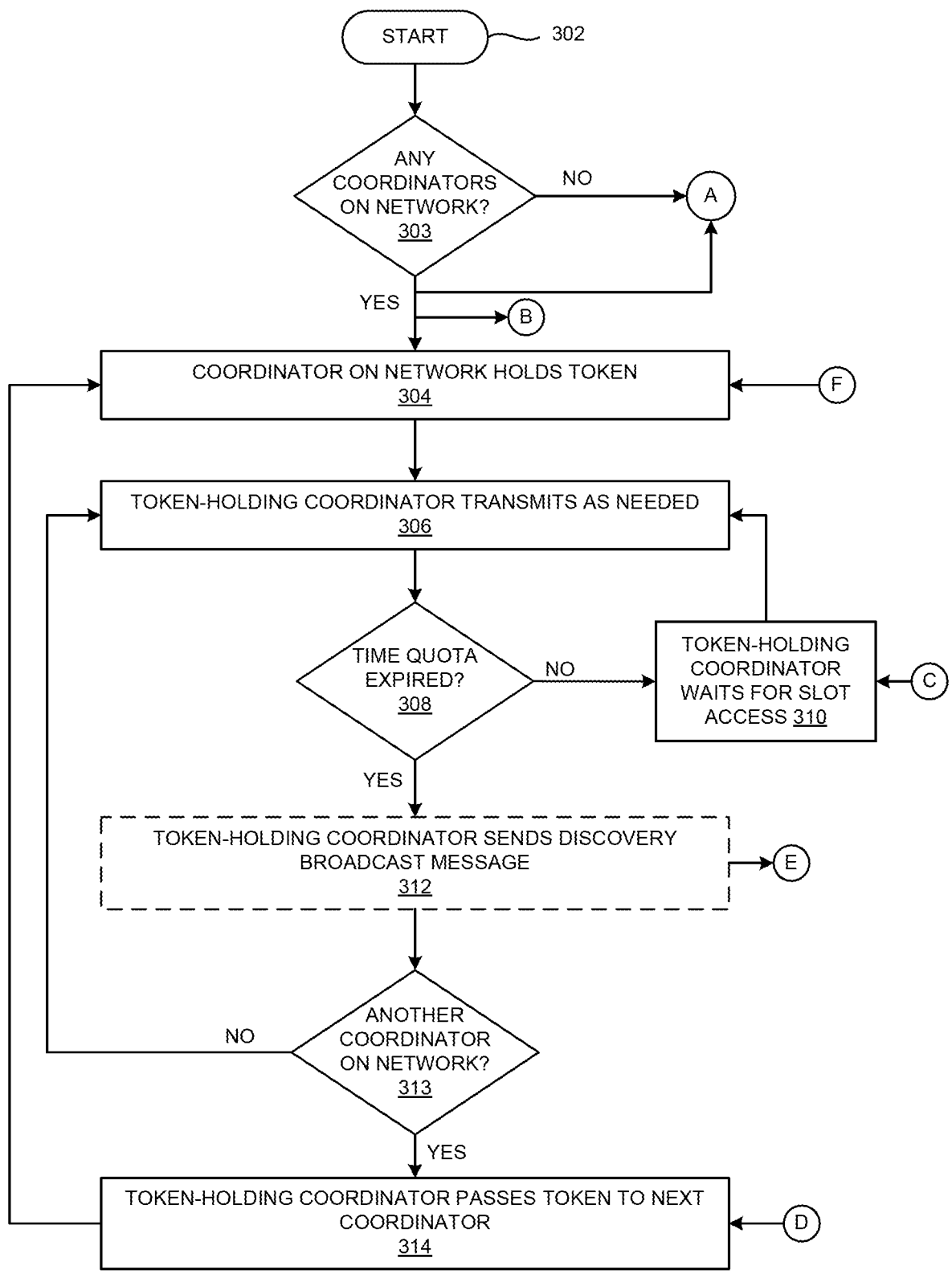
FIGS. 3A, 3B, and 3C depict a flow diagram of a method for inter-coordinator coordination for communicating on a shared communication media in accordance with one or more embodiments of the present invention.
Figure 3B:
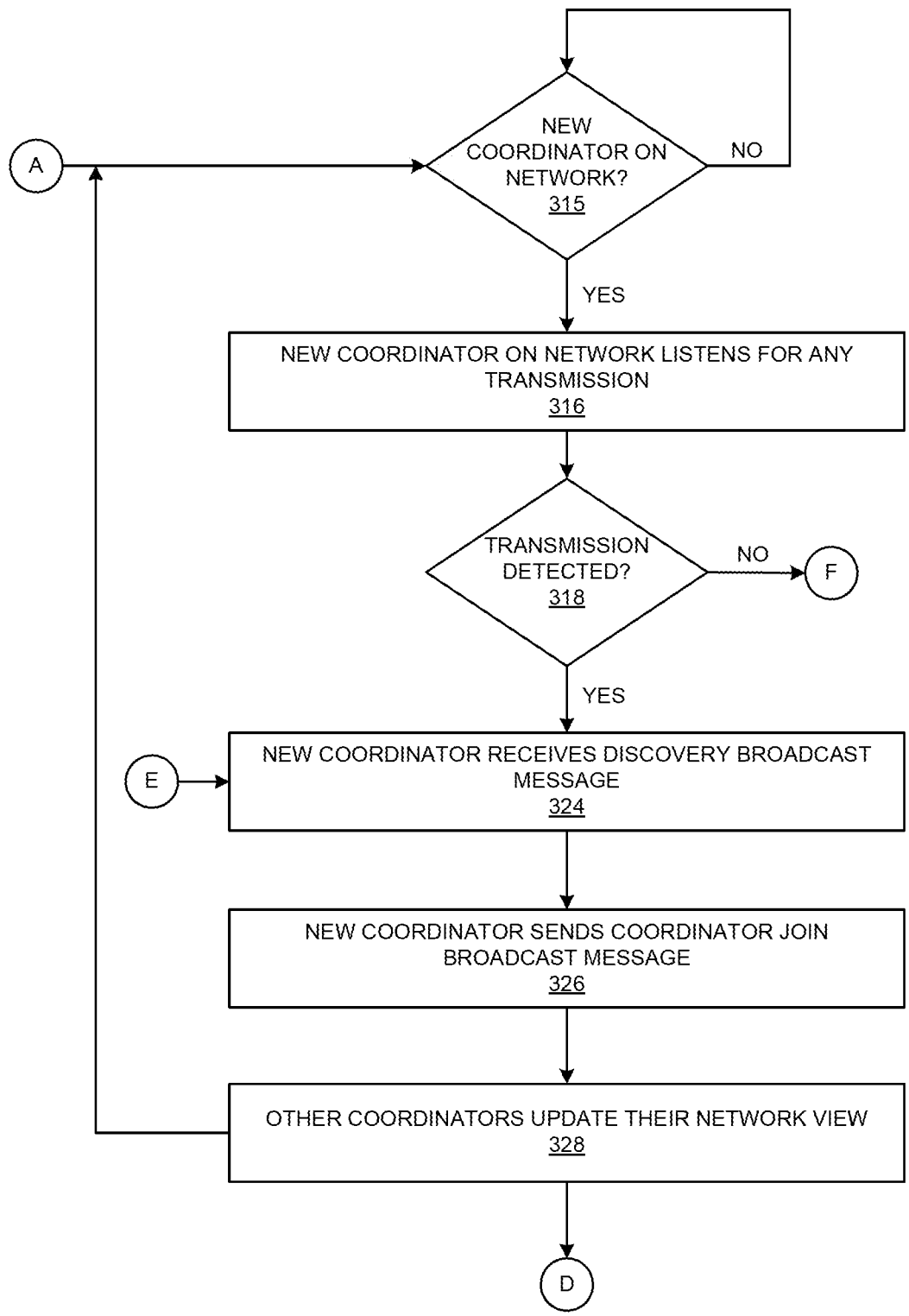
Figure 3C:
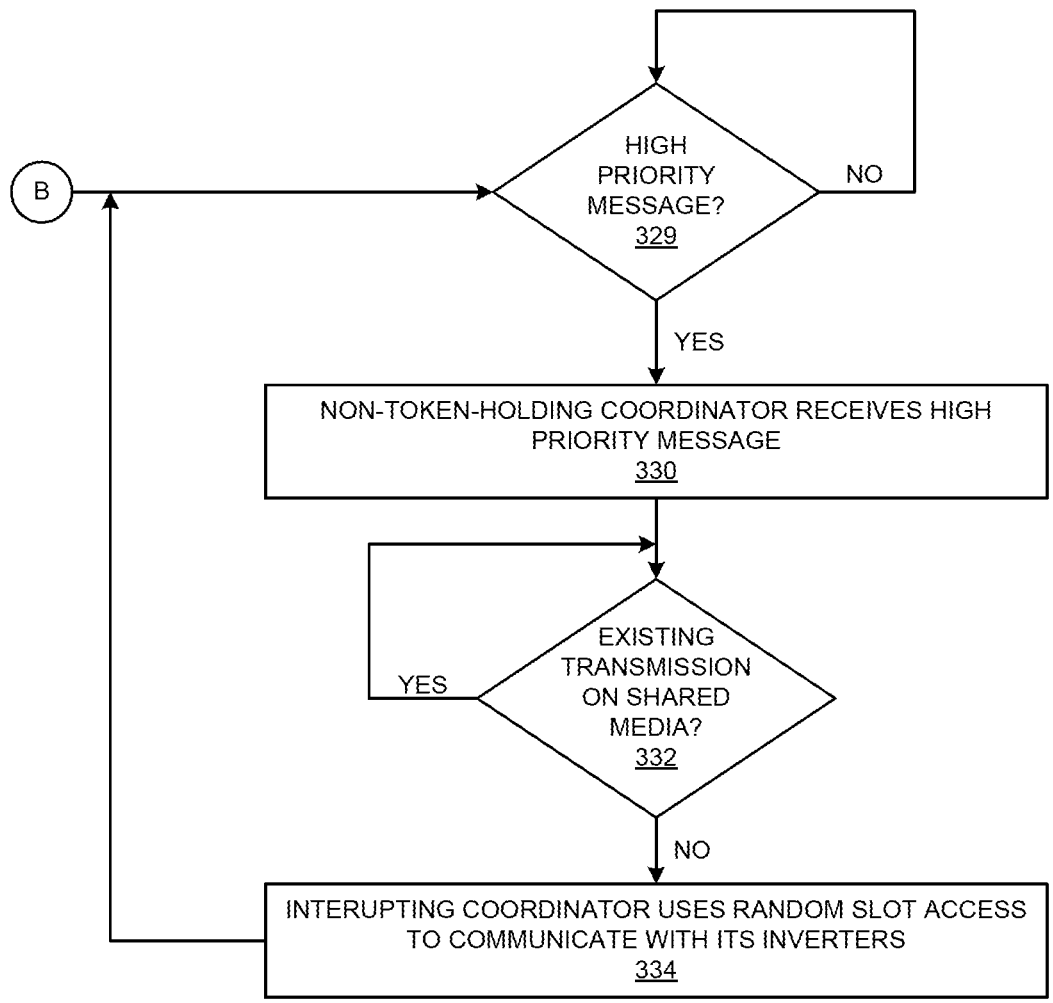

FIGS. 3A, 3B, and 3C depict a flow diagram of a method 300 for inter-coordinator coordination for communicating on a shared communication media in accordance with one or more embodiments of the present invention. The method 300 is an implementation of the communication module 214; in some embodiments, a computer readable medium comprises a program that, when executed by a processor of each coordinator on a shared communication media, performs the method 300 that is described in detail below.

The communication technique described herein is implemented by each of the system controllers that form a virtual ring on the shared communication media. The method 300 utilizes a virtual token-passing technique (which may be referred to herein as a token-passing protocol), which may be implemented by message passing, for non-urgent quality of service level communication. As opposed to contention-based protocols, the token-passing protocol described herein can support a high number of coordinators competing for the shared media with a high density and burstiness (i.e., short bursts of traffic regularly as opposed to rare big bursts) of traffic produced.

The token-passing mechanism overhead (i.e., token message transmission time) is inversely proportional to the time period of one coordinator holding the token. In various embodiments, each coordinator holding the token for a token hold time (THT) is in the range of 2-20 s and the overhead of token message would be (200 mS message+ gap)—10% to 1%. The worst latency for the token-passing protocol is the THT multiplied by the number of coordinators in the virtual ring; for example with a THT=2 seconds and 16 coordinators, the worst latency would be 32 seconds.

In various embodiments, such as the embodiment described below, the virtual token (which may be referred to herein simply as a token) is passed among multiple LRES coordinators sharing a power transmission feeder line (which may be referred to as the shared media) as described above; in other embodiments, the method 300 may be implemented by other types of nodes (e.g., other types of coordinators or controllers) on other types of shared communication media. In one or more embodiments, the non-urgent access described below uses 8-slot access (slow access window—SAW); randomization is not required, since there should not be a contention for the shared media.

The method 300 starts at step 302 and proceeds to step 303, where a determination is made whether there are any coordinators on the shared media. If the result of the determination is no, the method 300 proceeds to step 315 for discovering any new coordinators on the shared media (described in detail further below). If the result of the determination is yes, the method 300 still proceeds to step 315, as well as to step 329 for managing urgent communication on the shared communication media (described in detail further below), and step 304 for managing non-urgent communication on the shared media.

At step 304, a coordinator that is part of the virtual ring on the feeder line holds a virtual token. The virtual token, which may be implemented by a message protocol, is only held by one coordinator in the virtual ring at a time. While holding the virtual token, which may also be referred to herein as simply a token, the coordinator can use the feeder line to freely communicate with its corresponding inverters. The method 300 proceeds to step 306 where the coordinator holding the token periodically (using a particular slot access)

transmits data as needed to its corresponding inverters, for example for polling and bulk services.

At step 308, a determination is made whether a time quota for the coordinator holding the token has expired. The time quota is a fixed amount of time, the same for each coordinator that holds the token, that counts down once a coordinator receives the token. If the result of the determination is yes, that the time quota has expired, the method 300 proceeds to step 312.

In some embodiments, step 312 is only performed by the last coordinator in the network view table, and may only be performed during some cycles. In those embodiments where step 312 is performed. In those embodiments where step 312 is performed, the token-holding coordinator sends a discovery broadcast message in order to determine whether any new coordinators have joined the network, in those embodiments where there is a new coordinator to be discovered, the method 300 proceeds to step 324. In those embodiments where there are no new coordinators on the network, the token-holding coordinator terminates the discovery protocol after a timeout window expires without any response being received, and the method 300 proceeds to step 313. At step 313, a determination is made whether there are any other coordinators in the virtual ring. If the result of the determination is no, the method 300 returns to step 304; if the result of the determination is yes, the method 300 proceeds to step 314.

At step 314, the token-holding coordinator releases the token from itself and passes the token to the next coordinator in the network, where the next coordinator may be determined based on its ordinal number calculated from its domain ID using any suitable function and stored in the token-holding coordinator's network view. In one or more embodiments, the messaging protocol that is used to pass the token to another coordinator consists of one broadcast message transmitted from the token-holding coordinator and having a data item that is the domain ID of the coordinator to which the token is passed. In addition, it also contains the domain ID of the coordinator to which the token-receiving coordinator should next pass the token.

In various embodiments, an acknowledgement of token receipt is not needed since the sending coordinator can detect whether the target coordinator begins transmitting any messages after token passing, which is expected. If the sending coordinator does not detect any such messages during a timeout period, the token is then retransmitted when the timeout period expires. As such, the next message transmitted after the token is passed acts as an implicit acknowledgement of receipt of the token. If after several token retransmissions there is no communication by the coordinator to which the token was passed, that coordinator is deemed deleted from the virtual ring and the token-holding coordinator attempts to pass the token to the next coordinator in the network view table. All other coordinators in the virtual ring, upon observing these token-passing retransmissions, will also delete the non-responsive coordinator from their network view tables. The method 300 returns to step 304 where the token-receiving coordinator holds the virtual token.

At step 308, where a determination is made whether a time quota for the coordinator holding the token has expired, if the result of the determination is no, that the time quota has not expired, the method 300 proceeds to step 310. At step 310, the coordinator waits the appropriate number of slots and the method 300 then returns to step 306.

As described above, the method 300 proceeds from step 303 to step 315 for a joint discovery protocol for any new coordinators on the shared media to be discovered by any other coordinators on the shared media and to be included in the network view by the other coordinators. In order to support the token-passing messages as described above for the non-urgent quality of service level communication (i.e., the token-passing protocol), each coordinator must have a consistent view of all coordinators present on the shared media as well as on order of coordinators (e.g., based on, for example, each coordinator's ordinal number calculated from its domain ID using any suitable function) for token passing.

At step 315, a determination is made whether a new coordinator has been turned-up on the shared media. If the result of the determination is no, the method 300 returns to step 315; if the result of the determination is yes, the method 300 proceeds to step 316. At step 316, the new coordinator listens for any transmission on the feeder line to determine whether there are any other coordinators present. In one or more embodiments, the coordinator listens for any token-passing messages from another coordinator; even if there is no traffic on the network between a coordinator and its corresponding devices, the token-passing previously described occurs cyclically on the network.

The method 300 proceeds to step 318, where a determination is made whether any transmission is detected on the network. If the new coordinator does not detect any transmission on the network within a time period, such as the THT interval plus some random number (to avoid conflict if all coordinators are coming up from a power down event), then the result of the determination at step 318 is no, that there is no transmission on the network. The new coordinator can then assume it is alone on the network and the method 300 proceeds to step 304 where the new coordinator can begin communicating with its corresponding devices.

If, at step 318, the result of the determination is yes, that the new coordinator has detected transmission from another coordinator on the shared media, the method 300 proceeds to step 324. At step 324, the new coordinator awaits and receives a discovery message from another coordinator on the network. At step 326, the new coordinator (which may be referred to as a "waiting to join" coordinator on the network) sends a "coordinator join" broadcast message, containing its domain ID, with a random backoff within a response window. This message will be received by all coordinators on the network, causing them to add this new coordinator to their network view table. The joining coordinator, which does not yet have the network view built, monitors token-passing messages from other coordinators and builds its network view from there. If the joining coordinator receives a token-passing message before it has built its network view (and therefore does not know to which other coordinator the token should be passed), it will use the "next DomainID" field in the message to determine the next coordinator. In general, if there is a conflict between a coordinator's own view and information coming from a token-passing message from a previous coordinator for the next token coordinator, the information from the message should take priority for resolving the conflict if it is an addition of a coordinator and not a deletion of a coordinator. The method 300 then proceeds to step 314 where the current token-holding coordinator continues with a regular token-pass.

As described above, the method 300 proceeds from step 303 to step 329 for managing high-priority messages on the shared communication media in accordance with one or more embodiments of the present invention. The technique described herein for managing high-priority (i.e., urgent) quality of service level communication, which may be referred to as "high-priority protocol", manages urgent service messages which require low-latency (e.g., 1-2 seconds) and cannot wait for a token-passing window to come through the token-passing communication technique described above. Generally, the frequency of these urgent messages is sufficiently low such that it does not interfere with the probabilistic nature of the access protocol. In order to transmit the urgent messages, a higher priority access layer in the MAC layer protocol is created as follows At step 329, a determination is made whether a high-priority message has been sent for a non-token-holding coordinator. If the result of the determination is no, the method 300 returns to step 329; if the result of the determination is yes, the method 300 proceeds to step 330. At step 330, a non-token-holding coordinator on the virtual ring receives the high-priority message. The high-priority message may be received by the coordinator via any suitable communication technique and communication medium, such as PLC, wireless communication over the internet, and the like. In one or more embodiments, the coordinator receiving the high-priority message may be part of a smart grid and receive the message from a utility company to adjust inverter power generation, for example as part of demand response.

The method 300 proceeds to step 332, where a determination is made whether a token-based transmission is in progress on the shared media. If the result of the determination is yes, the method 300 returns to step 332. If the result of the determination is no, the method 300 proceeds to step 334.

At step 334, the coordinator that received the high-priority message uses a random number in slot access to communicate with its corresponding inverters. All accesses for high-priority services are done with a random number in slot access and a shorter access window than the accesses for the non-urgent services, which will be done with a longer access window. For example, in some embodiments, when the token-based access uses 8-slot access, the high-priority access uses a random number in 0-7 slot access. This randomization of access is utilized in order to accommodate embodiments where multiple coordinators might want to access the shared media. In one or more alternative embodiments, the random window for the high-priority message slot access may be adapted to the actual number of coordinators discovered on the network (i.e., on the shared media).

It is also important to understand that high-priority service is able to preempt the current token window on a different coordinator, but it is able to interrupt it in the point where it starts next information transaction, the current information transaction should end in a normal way. As such, the latency is no longer than the longest transaction time; for example, in embodiments where no transaction takes more than 1 second, a 1 second latency can be satisfied. In various alternative embodiments where there is a requirement for even shorter latency (i.e., less than the longest transaction time) and therefore even current transactions need to be able to be preempted, each fragment in multi-fragment transmission is started with SAW, not just start of transaction, which will significantly increase overhead for the protocol. For example, for a maximum fragment (108/128 bytes) transmission length to be 315 mS at regular 5 kB ¾RS, and an 8-slot delay is added to that (16 mS)—the minimum overhead would be of 5%.

The method 300 proceeds to step 336, where the high-priority message thread ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for communication on a shared communication media, comprising:
   holding a virtual token for a fixed time quota, the virtual token held by a first coordinator of a plurality of coordinators that form a virtual ring on the shared communication media, wherein only a virtual-token-holding coordinator of the plurality of coordinators is permitted to transmit data associated with a first quality of service level;
   periodically transmitting data associated with the first quality of service level, by the first coordinator while holding the virtual token, to one of more power conditioners on a local domain associated with the first coordinator;
   passing, by the first coordinator when the fixed time quota expires, the virtual token to a second coordinator of the plurality of coordinators;
   periodically transmitting data associated with the first quality of service level, by the second coordinator while holding the virtual token, to one of more power conditioners on a local domain associated with the second coordinator, wherein the second coordinator holds the virtual token for the fixed time quota;
   receiving, by a third coordinator of the plurality of coordinators and while the second coordinator holds the virtual token, a message requiring the third coordinator to transmit data associated with a second quality of service level to one or more power conditioners of a local domain associated with the third coordinator; and
   transmitting, by the third coordinator and while the second coordinator is not transmitting any data, the data associated with the second quality of service level to the one or more power conditioners of the local domain associated with the third coordinator.

2. The method of claim 1, further comprising passing, by the second coordinator when the fixed time quota expires, the virtual token to another coordinator of the plurality of coordinators.

3. The method of claim 1, further comprising sending, by the second coordinator while holding the virtual token, a discovery broadcast message on the shared communication media.

4. The method of claim 3, further comprising:
   receiving, by a new coordinator that is communicably coupled to the shared communication media but not part of the virtual ring, the discovery broadcast message;
   transmitting, by the new coordinator in response to the discovery broadcast message, a coordinator join message on the shared communication media;
   receiving, by the plurality of coordinators, the coordinator join message; and
   adding, by each coordinator of the plurality of coordinators, the new coordinator to the virtual ring.

5. The method of claim 1, wherein the second coordinator communicates using a fixed slot number.

6. The method of claim 5, wherein the third coordinator communicates using a random slot number less than the fixed slot number.

7. The method of claim 1, wherein the local domain is a PLC network.

8. The method of claim 1, wherein the shared communication media is a power distribution line.

9. The method of claim 1, wherein the first quality of service level is for non-urgent communication and the second quality of service level is for urgent communication.

10. The method of claim 1, wherein the data associated with the second quality of service level requires the one or more power conditioners of the local domain associated with the third coordinator to adjust power production.

11. A non-transitory computer readable medium comprising a program that, when executed by a processor of each local renewable energy source system controller on a shared communication media, performs a method for communication on the shared communication media, the method comprising:

holding a virtual token for a fixed time quota, the virtual token held by a first coordinator of a plurality of coordinators that form a virtual ring on the shared communication media, wherein only a virtual-token-holding coordinator of the plurality of coordinators is permitted to transmit data associated with a first quality of service level;

periodically transmitting data associated with the first quality of service level, by the first coordinator while holding the virtual token, to one of more power conditioners on a local domain associated with the first coordinator;

passing, by the first coordinator when the fixed time quota expires, the virtual token to a second coordinator of the plurality of coordinators;

periodically transmitting data associated with the first quality of service level, by the second coordinator while holding the virtual token, to one of more power conditioners on a local domain associated with the second coordinator, wherein the second coordinator holds the virtual token for the fixed time quota;

receiving, by a third coordinator of the plurality of coordinators and while the second coordinator holds the virtual token, a message requiring the third coordinator to transmit data associated with a second quality of service level to one or more power conditioners of a local domain associated with the third coordinator; and transmitting, by the third coordinator and while the second coordinator is not transmitting any data, the data associated with the second quality of service level to the one or more power conditioners of the local domain associated with the third coordinator.

12. The non-transitory computer readable medium of claim 11, further comprising passing, by the second coordinator when the fixed time quota expires, the virtual token to another coordinator of the plurality of coordinators.

13. The non-transitory computer readable medium of claim 11, further comprising sending, by the second coordinator while holding the virtual token, a discovery broadcast message on the shared communication media.

14. The non-transitory computer readable medium of claim 13, further comprising:

receiving, by a new coordinator that is communicably coupled to the shared communication media but not part of the virtual ring, the discovery broadcast message;

transmitting, by the new coordinator in response to the discovery broadcast message, a coordinator join message on the shared communication media;

receiving, by the plurality of coordinators, the coordinator join message; and adding, by each coordinator of the plurality of coordinators, the new coordinator to the virtual ring.

15. The non-transitory computer readable medium of claim 11, wherein the second coordinator communicates using a fixed slot number.

16. The non-transitory computer readable medium of claim 15, wherein the third coordinator communicates using a random slot number less than the fixed slot number.

17. The non-transitory computer readable medium of claim 11, wherein the local domain is a PLC network.

18. The non-transitory computer readable medium of claim 11, wherein the shared communication media is a power distribution line.

19. The non-transitory computer readable medium of claim 11, wherein the first quality of service level is for non-urgent communication and the second quality of service level is for urgent communication.

20. The non-transitory computer readable medium of claim 11, wherein the data associated with the second quality of service level requires the one or more power conditioners of the local domain associated with the third coordinator to adjust power production.

* * * * *